United States Patent [19]

Nakamura

[11] Patent Number: 5,431,601
[45] Date of Patent: Jul. 11, 1995

[54] SEAL FASTENER AND A BOOT FOR A UNIVERSAL COUPLING INCLUDING SUCH A FASTENER

[75] Inventor: Saburo Nakamura, Nagoya, Japan

[73] Assignee: Tokue Rubber Industrial Co. Ltd., Japan

[21] Appl. No.: 253,226

[22] PCT Filed: Oct. 30, 1991

[86] PCT No.: PCT/JP91/01480
§ 371 Date: Feb. 3, 1993
§ 102(e) Date: Feb. 3, 1993

[87] PCT Pub. No.: WO92/21260
PCT Pub. Date: Dec. 10, 1992

Related U.S. Application Data

[63] Continuation of Ser. No. 969,835, Feb. 3, 1993, abandoned.

[30] Foreign Application Priority Data

Jun. 7, 1991 [JP] Japan ................... 3-136741
Jun. 7, 1991 [JP] Japan ................... 3-136764

[51] Int. Cl.⁶ ............... F16D 3/84; A44B 19/16
[52] U.S. Cl. .................... 464/175; 24/400; 277/212 FB
[58] Field of Search ................ 464/173, 175; 277/212 FB; 24/399, 400, 587, 576

[56] References Cited

U.S. PATENT DOCUMENTS

| | | | |
|---|---|---|---|
| 1,702,426 | 2/1929 | Anderegg | 24/587 |
| 1,703,712 | 2/1929 | Aug | 24/400 X |
| 1,959,318 | 5/1934 | Sundback | 24/400 |
| 1,959,319 | 5/1934 | Sipe | 24/400 |
| 2,025,635 | 12/1935 | Bishoff | 464/173 |
| 4,558,869 | 12/1985 | Grove et al. | 277/212 FB |
| 4,813,913 | 3/1989 | Belter | 464/175 |

FOREIGN PATENT DOCUMENTS

| | | | |
|---|---|---|---|
| 1245236 | 7/1967 | Germany | 272/212 FB |
| 5097441 | 8/1975 | Japan . | |
| 55-129007 | 9/1980 | Japan . | |
| 62-122925 | 4/1987 | Japan . | |
| 63-178504 | 4/1988 | Japan . | |
| 64-20539 | 2/1989 | Japan . | |
| 132430 | 10/1989 | Japan . | |
| 2010988 | 7/1979 | United Kingdom | 277/212 FB |

*Primary Examiner*—Daniel P. Stodola
*Assistant Examiner*—Eileen A. Dunn
*Attorney, Agent, or Firm*—William E. Mouzavires

[57] ABSTRACT

A seal fastener provided between the facing edges of two sheets (7) for joining and separating them has a male interlocking strip (13) formed along the edge of one of the sheets and having a bulging edge (14), and a female interlocking strip (16) formed from a rubbery elastic material along the edge of the other sheet and having an interlocking groove (17) for receiving the male interlocking strip therein. The male interlocking strip (13) is provided with a clamped insert (15) embedded therein and having a corrugated shape in top plan, and the female interlocking strip is provided with a clamping insert (19A or 19B) embedded therein about its interlocking groove (17) and having a substantially ovoid cross-sectional shape like the fruit of an eggplant. The fastener is easy to close and is high in durability.

5 Claims, 7 Drawing Sheets

SEAL FASTENER AND A BOOT FOR A UNIVERSAL COUPLING INCLUDING SUCH A FASTENER

This application is a continuation of application Ser. No. 07/969,835, filed Feb. 3, 1993, now abandoned.

TECHNICAL FIELD

This invention relates to a seal fastener. It is a fastener which is suitable for use with, for example, a dust boot of rubber for a coupling in an automobile, machine tool, or machine for construction, or other industrial purpose (a boot of the type having a longitudinal split provided with a fastener to facilitate maintenance; see Utility Model Application laid open under No. Sho 63-160469), or a raincoat, ski wear, wet suit, or clothes for protection against cold in which the fastener is required to form a seal between the interlocking edges. It is applicable not only to any field in which a fastener has hitherto been employed, but also for forming a seal in civil engineering or construction work (e.g. for preventing the flow of water in a dam).

The term "rubbery elastic material" as herein used means any material that is capable of being stretched to a length at least twice larger than its original length, but recovering its original length immediately upon removal of a force for stretching it, and includes not only natural or synthetic rubber, but a thermoplastic elastomer as well.

BACKGROUND ART

FIG. 1 shows by way of example a common slide fastener which has hitherto been employed for joining and separating the edges of sheets.

The fastener comprises a pair of strips 1 of a knit fabric, interlocking members 3 of metal or plastic attached to each strip 1, and a slider 5 for interlocking the interlocking members 3 on one strip 1 with those on the other, each strip 1 being attached to the edge of one of two sheets 7.

The fastener as hereinabove described has, however, not been capable of forming a seal between the joined edges of the interlocking members, but it has usually been necessary to provide the joined edges with a waterproof cloth, or sealing member to form a seal therebetween (see e.g. patent application laid open under No. Sho 60-198102 and Utility Model Application laid open under No. Sho 63-160469).

It has, therefore, been proposed in the above applications that the interlocking members be coated with a viscous resin, or given water-repelling treatment to be capable of forming a seal therebetween. These proposals, however, call for extra work or treatment. Moreover, in some cases of fastener application, as in a boot for which grease is used, it is likely that the lowering in quality of the materials employed for such treatment may result in a lower sealing property with the passage of time.

To overcome the above problems, the applicant of the present application has proposed a seal fastener as shown in FIGS. 2 and 3, and as described below (see patent application laid open under No. Hei 1-204607) whose disclosure is hereby incorporated by reference herein.

It is provided between the edges of sheets 7 for joining or separating them, and comprises a male interlocking strip 13 formed along one of those edges and having a bulging edge 14, a female interlocking strip 16 formed from a rubbery elastic material along the other edge and having an interlocking groove 17 for receiving the male interlocking strip 13 therein, and a clamping insert 19 formed from a spring material and embedded in the female interlocking strip 16 about its interlocking groove 17 for imparting a resiliently clamping force to the female interlocking strip 16 between the facing edges of its groove opening.

The problems which will be pointed out below have, however, been found to arise in connection with the use of the seal fastener as hereinabove described:

(1) It is not always easy to interlock the male interlocking strip 13 with the female interlocking strip 16; and (2) The fastener is not necessarily good in durability, since its repeated use results in the formation of a crack behind the bulging edge 14 of its male interlocking strip 13, or the lowering of the resiliently clamping force of its female interlocking strip 16.

Under these circumstances, it is an object of this invention to provide a seal fastener which is easy to interlock and is good in durability.

DISCLOSURE OF THE INVENTION

The inventor of this invention has made a great deal of research and development work to overcome the above problems, and thought of a seal fastener as will be described below.

A seal fastener provided between the edges of two sheets for joining and separating them, and comprising a male interlocking strip formed along the edge of one of the sheets and having a bulging edge, and a female interlocking strip formed from a rubbery elastic material along the edge of the other sheet and having an interlocking groove for receiving the male interlocking strip therein, characterized by a clamped insert formed from a linear spring material, having a corrugated shape in top plan, and embedded in the male interlocking strip to impart to it rigidity in the direction of interlocking; and by a clamping insert formed from a linear spring material, having a substantially ovoid cross-sectional shape like the fruit of an eggplant, and embedded in the female interlocking strip about its interlocking groove to impart a resiliently clamping force to the female interlocking strip between the edges of its groove opening.

This invention has the following advantages owing to its construction as described above:

(i) As the clamped insert 15 is corrugated, the male interlocking strip 13 is flexible in the direction of its length, but rigid in the direction of its width. Therefore, the male interlocking strip 13 is easier to interlock with the female interlocking strip 16 without having its bulging edge 14 swing. The insert extends into the bulging edge 14, and prevents not only its swinging motion, but also its stretching motion which would otherwise result in the formation of a crack in its root;

(ii) As the clamping insert has substantially no angular portion, the repeated use of the fastener does not produce any flexural fatigue of the spring material, but the clamping insert can maintain a good clamping force for a long period of time. Therefore, it contributes to improving the durability of the fastener;

(iii) Thus, the seal fastener of this invention has the advantages:

(1) That the male interlocking strip 13 is easier to interlock with the female interlocking strip 16; and (2) That its durability is greatly improved over what has hitherto been possible, since its repeated use is hardly likely to result in the formation of any crack in the root of the bulging edge of its male interlocking strip, or the lowering of the resiliently clamping force of its female interlocking strip.

BEST MODE FOR CARRYING OUT THE INVENTION

Figure 1:
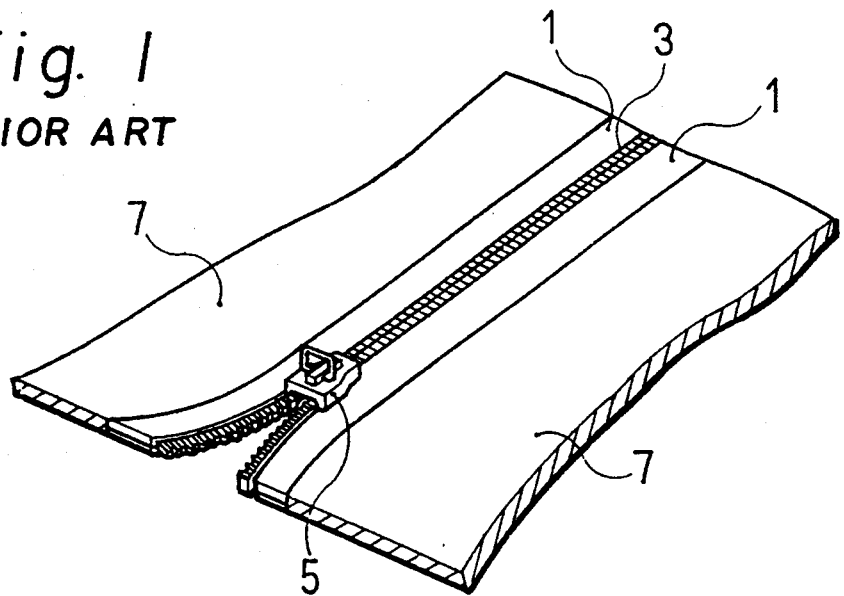
FIG. 1 is a fragmentary perspective view of a conventional seal fastener.

The invention will now be described with reference to specific embodiments thereof, which are not intended for limiting the scope of this invention. The description of some parts is wholly or partly omitted, since they have already been described as parts of the known devices, and like reference numerals are used to denote like parts throughout the drawings.

EMBODIMENT A

Figure 2:
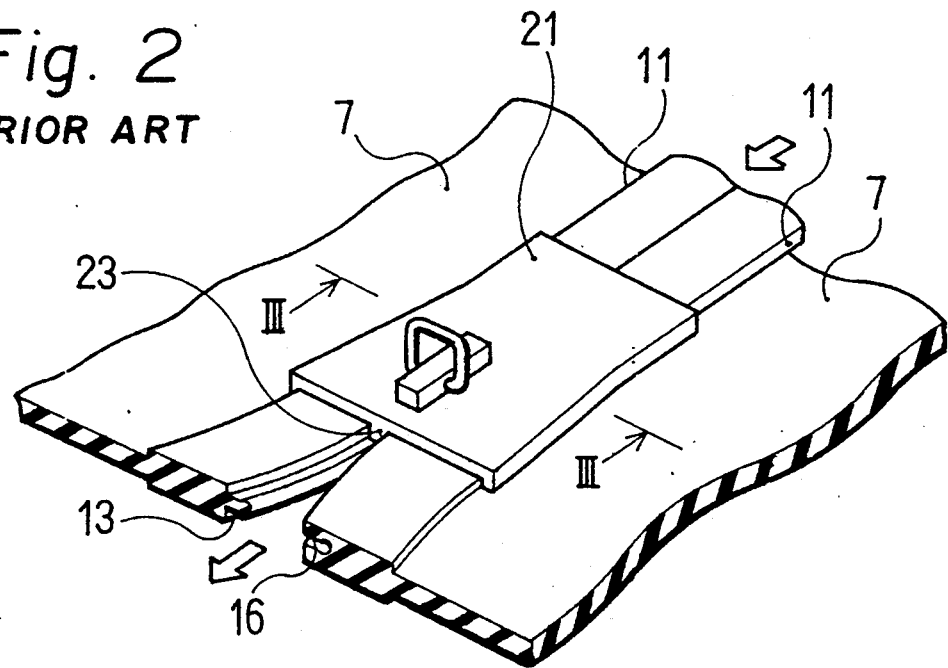
FIG. 2 is a fragmentary perspective view of the prior art on which the fastener of this invention is based.
Figure 3:
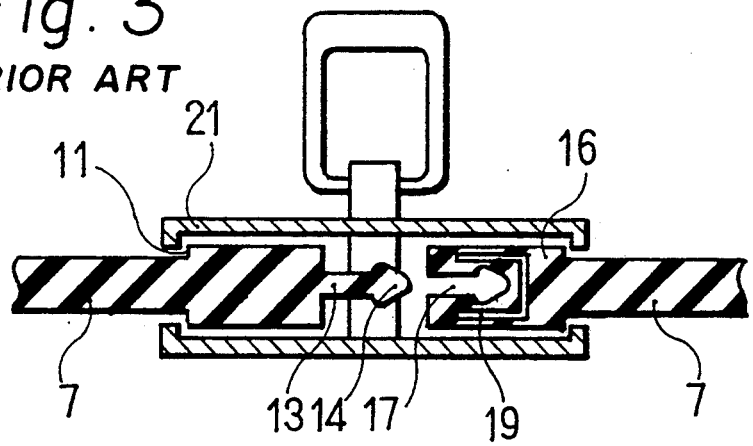
FIG. 3 is an enlarged sectional view taken along the line III—III of FIG. 2.
Figure 4:
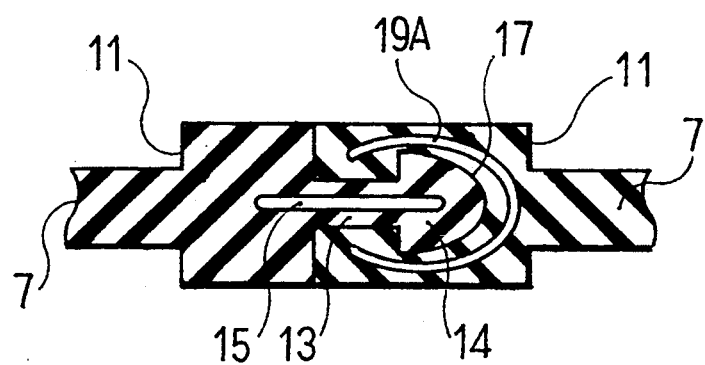
FIG. 4 is a fragmentary cross-sectional view of a seal fastener embodying this invention.
Figure 5:
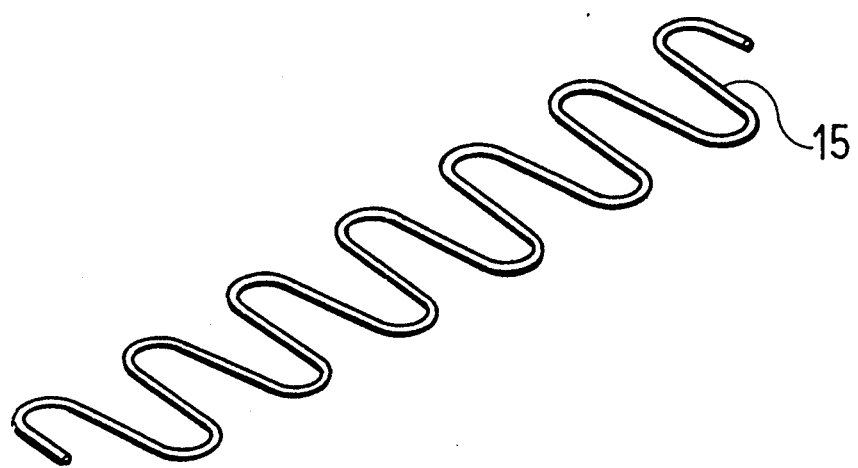
FIG. 5 is a perspective view of one form of a clamped insert embedded in the male interlocking strip of the fastener shown in FIG. 4.
Figure 6:
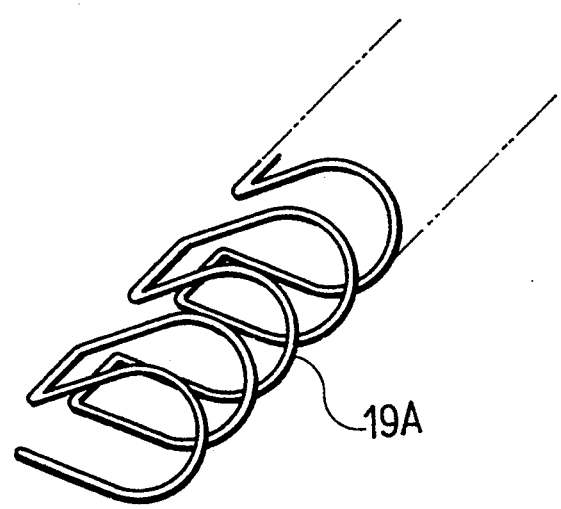
FIG. 6 is a perspective view of one form of a clamping insert embedded about the interlocking groove of the fastener shown in FIG. 4.
Figure 7:
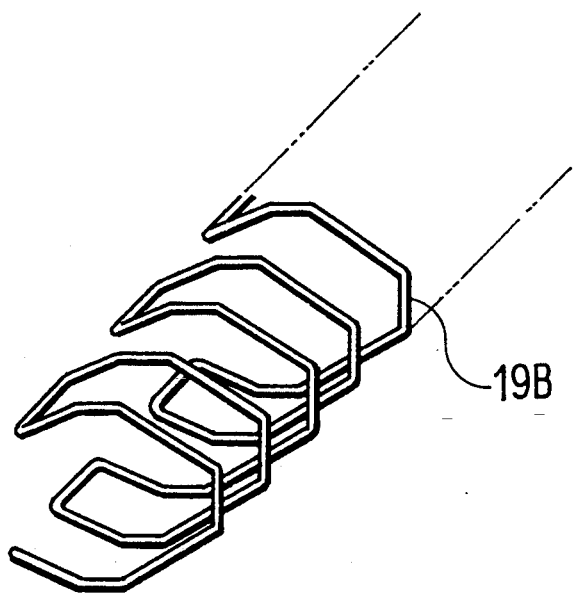
FIG. 7 is a perspective view of another form of the clamping insert.

A seal fastener embodying this invention is shown in FIGS. 4 to 7. For its overall construction, however, reference is made to FIGS. 2 and 3 showing the prior art.

The fastener will be described as being employed between the edges of two sheets 7 of rubber. The sheets may, however, be of any other flexible material, e.g. plastic, or waterproof cloth.

Each of the sheets 7 has a pair of slider guide shoulders 11 formed along and inwardly of its edge facing the edge of the other sheet 7 and on the opposite sides, respectively, of the sheet 7. The shoulders are shown as being formed by an increased sheet thickness, but may alternatively be defined by grooves formed on the opposite sides of the sheet.

The fastener includes a male interlocking strip 13 formed along the edge of one sheet and having a bulging edge 14, and a female interlocking strip 16 formed along the edge of the other sheet and having an interlocking groove 17 shaped like a keyhole for receiving the male interlocking strip 13 therein.

The male interlocking strip 13 has a general thickness which is smaller than the width of the inlet opening of the interlocking groove 17. The male interlocking strip 13 is provided with a clamped insert 15 formed from a linear spring material, having a corrugated shape in top plan, and embedded in the male interlocking strip 13 to impart to it rigidity in the direction of interlocking. The clamped insert 15 has a width which enables it to extend from the sheet 7 to the bulging edge 14 of the male interlocking strip 13. The corrugations of the insert 15 have a pitch of 2 to 5 mm if it has a wire diameter of 0.3 mm and a width of 6 mm.

The female interlocking strip 16 is provided with a clamping insert 19A (FIG. 6) formed from a linear spring material, having a substantially ovoid cross-sectional shape like the fruit of an eggplant, and embedded in the female interlocking strip 16 about its interlocking groove 17 to impart a resiliently clamping force to the strip 16 between the edges of its groove opening. There is no particular limitation to the shape of the clamping insert 19A if it is substantially ovoid in cross section, but another possible form of clamping insert comprises a linear material, or wire bent in a staggered fashion and forming a groove-like open space tapered to an open edge, as shown at 19B in FIG. 7. Owing to its substantially ovoid shape, it can withstand repeated use without causing any flexural fatigue of the spring material, and maintain a good clamping force for a long period of time. It, therefore, contributes to improving the durability of the fastener. Its material is not limited to metal, but may alternatively be a hard plastic if it can produce an appropriate spring force.

A slider 21 bridging the adjacent edge portions of the sheets 7 has a pair of longitudinal edges engaging the slider guide shoulders 11 on the sheets 7, respectively, on either side thereof. The slider 21 is an ordinary one having a portion of gradually increasing width which is provided with an opening shank 23, and in which the fastener is opened, while its remaining portion in which the fastener is closed has a pair of parallel longitudinal edges.

Description will now be made of the use of the fastener as hereinabove described.

Referring to FIG. 2, the sliding motion of the slider 21 in the direction of white arrows causes the male interlocking strip 13 to interlock with the keyhole-shaped interlocking groove 17 of the female interlocking strip 16 as a result of its bulging edge 14 forcing apart the edges of the opening of the groove 17. The interlocking or insertion of the male interlocking strip 13 is facilitated by the clamped insert 15 embedded therein to impart to it rigidity in the direction of its insertion. The general portion of the male interlocking strip 13 other than its bulging edge 14 is held between the opposite sides of the interlocking groove 17 in intimate contact therewith, since the spring force of the clamping insert 19A (or 19B) urges the opposite sides of the groove 17 toward each other, and since the female interlocking strip 16 is of a rubbery elastic material. Thus, there is produced a large force preventing the disengagement of the male interlocking strip from the female one, while a seal against the flow of a fluid is formed therebetween.

The movement of the slider 21 in the opposite direction causes the opening shank 23 to tear the fastener open by disengaging the male interlocking strip 13 from the female interlocking strip 16.

Although the slider 21 bridging the facing edges of the sheets and sliding along them facilitates the opening and closing of the fastener, this invention is also applicable to a fastener having no slider. Such a fastener can be opened and closed by hand, or with an appropriate device.

Although the male interlocking strip 13 has been shown as being formed from the same material with the sheet 7 (rubber) as an integral part thereof, it is also possible to form it from a different material, such as a semihard plastic, and insert it in the sheet when the latter is molded, if it does not need to be very flexible.

EMBODIMENT B

Attention is now directed to FIGS. 8 to 12 showing a boot embodying this invention which includes a seal fastener as hereinabove described.

A boot including the conventional seal fastener has been found to have a problem as stated below:

(1) While the universal three-dimensional angular motion of a shaft in a universal coupling causes the boot to flex, the mutual interference of the pleats results in a worn boot surface which makes it necessary to change the boot to a new one within a short time. Thus, there has been a desire for a boot of improved durability.

It is, therefore, an object of this invention to overcome the above problem and provide a boot of improved durability by employing a seal fastener of the construction hereinabove described as Embodiment A.

Figure 8:
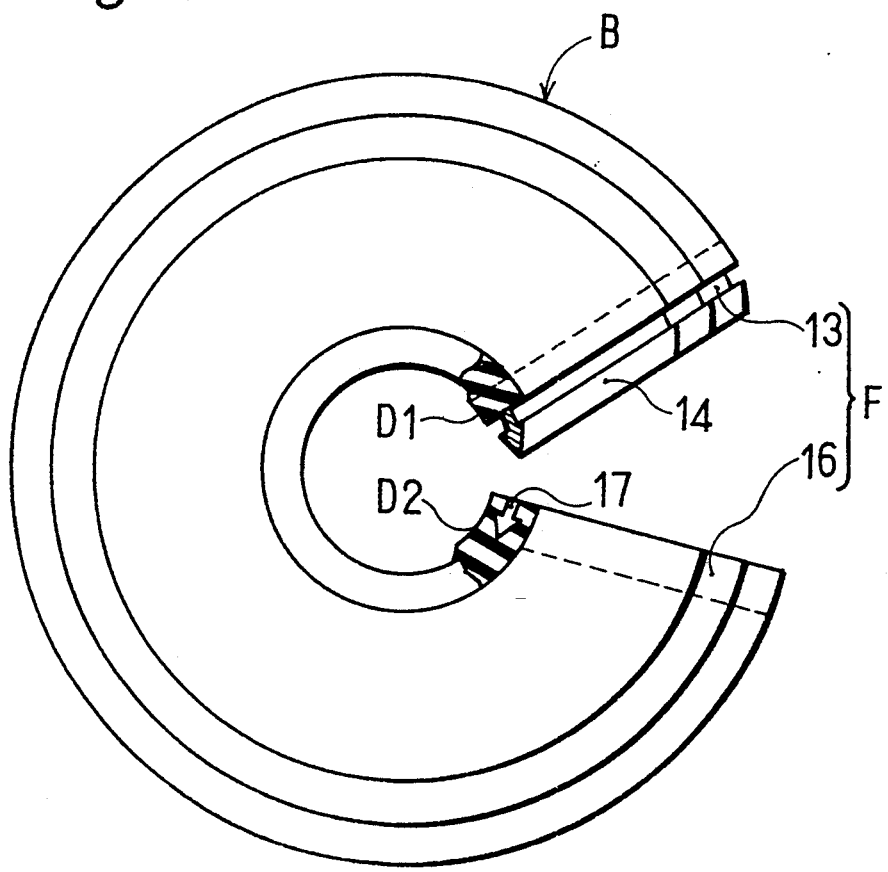
FIG. 8 is a partly cutaway top plan view of a boot embodying this invention and including the seal fastener embodying this invention (and shown in its open position).
Figure 9:
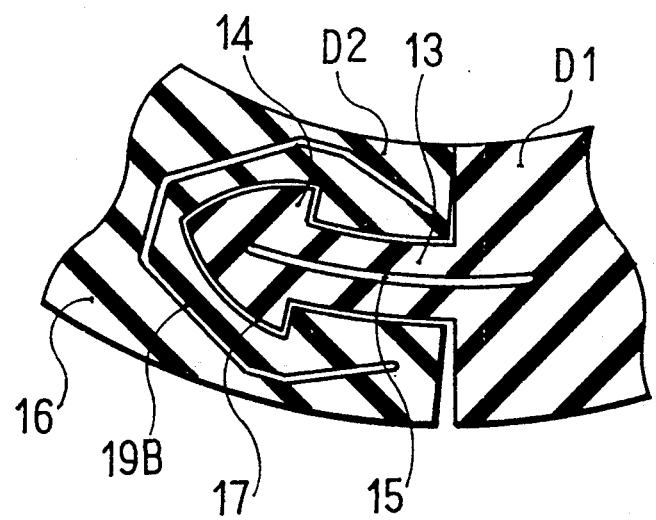
FIG. 9 is a fragmentary cross-sectional view of the boot with the fastener shown in its closed position.
Figure 10:
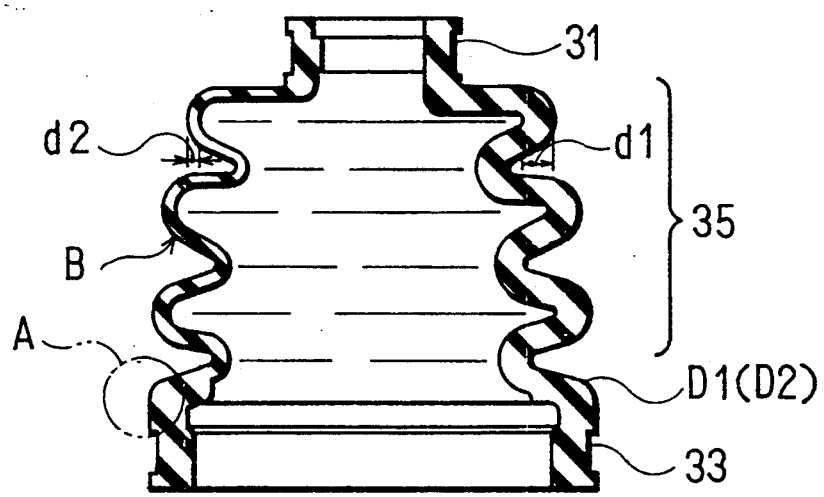
FIG. 10 is a longitudinal sectional view of the boot with the fastener shown in its closed position.
Figure 13:
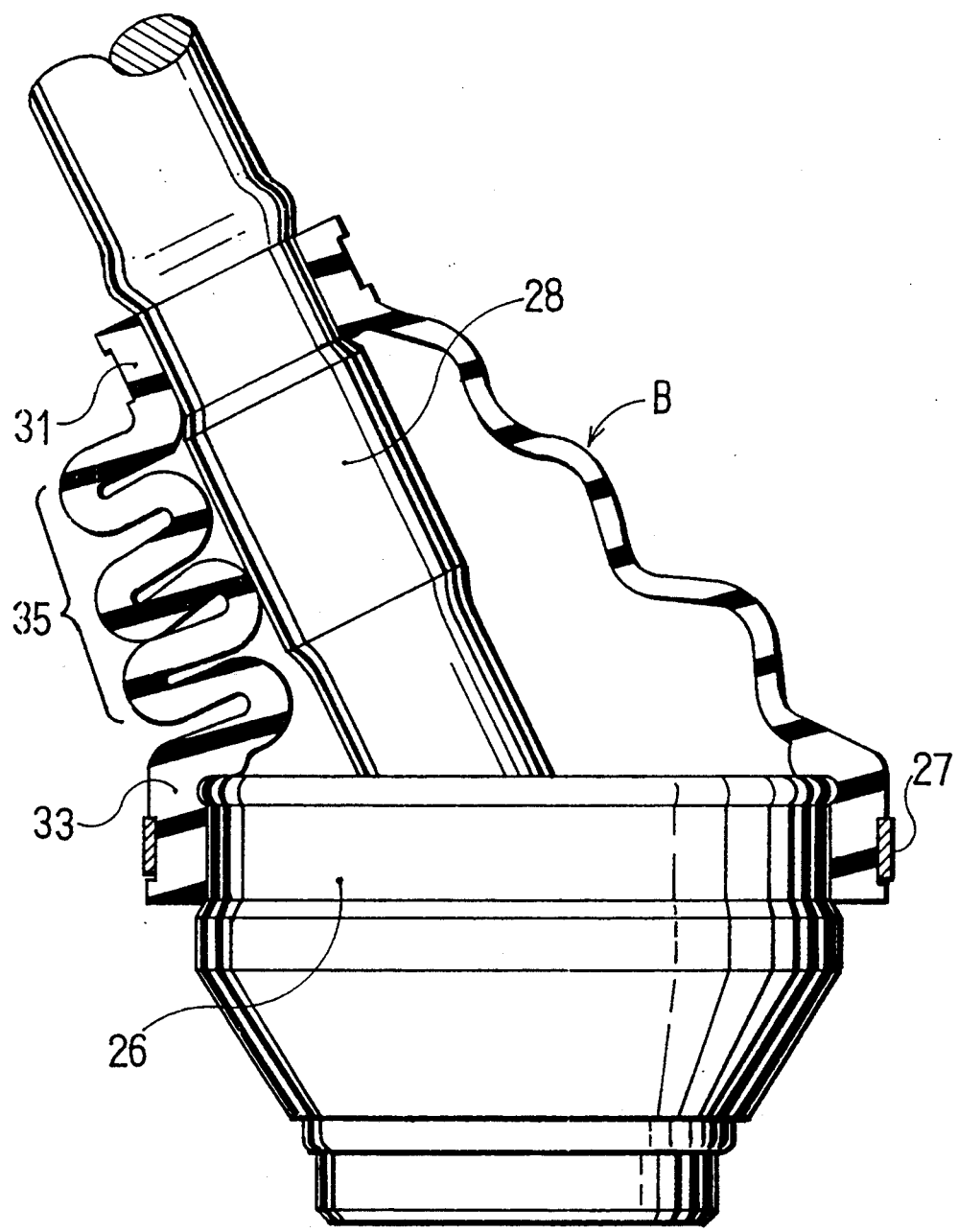
FIG. 13 is a longitudinal sectional view of the boot employed for a particular purpose.

(i) A boot B embodying this invention is formed from a high-molecular elastic material, and essentially comprises a small-diameter ring portion 31, a large-diameter ring portion 33, and a bellows portion 35 extending between the ring portions 31 and 33, the boot being split in a straight line from its small-diameter ring portion 31 to its large-diameter ring portion 33, and having two facing edge portions D1 and D2 each having a greater wall thickness than the greater part of the boot, the edge portions D1 and D2 being provided with a seal fastener F (see FIGS. 8, 10 and 13).

The boot (which is usually filled with grease) has grease resistance. It is injection molded in its open or spread form from rubber, such as chloroprene or acrylic rubber.

Its greater-thickness portions D1 and D2 have a wall thickness d1 of 6 to 7 mm if the greater part of the boot has a wall thickness d2 of 2 mm. The edge portions D1 and D2 have a total width of 7 to 8 min.

(ii) The seal fastener F is of the same construction with that described above as Embodiment A (see FIG. 9). (iii) According to salient features of the boot embodying this invention, the greater thickness of the split edge portions D1 and D2 is due to the protrusion formed on the inner surface of the boot, and the large-diameter ring portion has a shoulder 33a which is beveled along its entire circumference.

Figure 11:
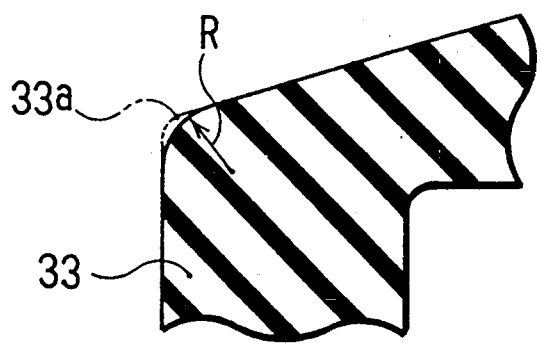
FIG. 11 is an enlarged view of part A of FIG. 10 showing one form of a beveled shoulder on the boot embodying this invention.
Figure 12:
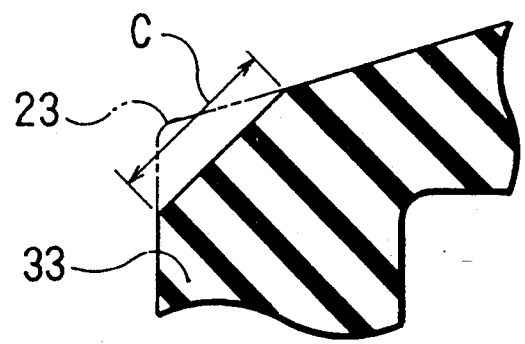
FIG. 12 is a view similar to FIG. 11, but showing another form of the beveled shoulder.

The beveled shoulder has a rounded surface (FIG. 11), or a chamfered surface (FIG. 12). The rounded surface has a radius R of 2 to 6 mm (preferably 3 to 5 mm), and the chamfered surface has a chamfered width C of 2 to 6 mm (preferably 3 to 5 mm). The two-dot chain line in each of FIGS. 11 and 12 shows the contour of the shoulder on the large-diameter ring portion 33 of a conventional boot.

(iv) Description will now be made of the use of the boot embodying this invention (see FIG. 13).

The boot B is used in its open form to fit about a universal coupling, as the conventional boot is. The male interlocking strip 13 of the fastener is interlocked with the female interlocking strip 16 to join the split edge portions D1 and D2 together, so that the large-diameter ring portion 33 may be fitted about the housing 26 of the coupling, and the small-diameter ring portion 31 about the shaft 28 of the coupling, whereby the boot B is fitted about the coupling. The boot is filled with grease.

The male interlocking strip 13 on the split edge portion D1 is held by hand, and gradually forced into the interlocking groove 17 of the female interlocking strip 16 from the large-diameter ring portion 33 or the small-diameter ring portion 31. The male interlocking strip 13 is interlocked with the keyhole-shaped interlocking groove 17 as a result of its bulging edge 14 forcing the opposite sides of the groove 17 apart. The male interlocking strip 13 is easy to interlock owing to the clamped insert 15 embedded therein to impart to it rigidity in the direction of its insertion. The general portion of the male interlocking strip 13 is held between the opposite sides of the interlocking groove 17 in intimate contact therewith, since the clamping insert 19B exerts a spring force urging the opposite sides of the groove 17 toward each other, and since the female interlocking strip 16 is of a rubbery elastic material. Thus, the fastener forms a sealed joint, while maintaining a large force holding the edge portions in a mutually interlocked relation. A clamping band 27 of metal is usually fitted about the large-diameter ring portion 33 to ensure that the boot be held in position.

It is desirable to coat one or both of the male and female interlocking strips 13 and 16 with silicone oil to achieve a still easier interlocking job and an improved sealing of the joint.

When it is necessary to change the boot after a long time of use, the clamping band 27 is removed from the large-diameter ring portion 33, and the large-diameter ring portion 33 is torn apart by the hands holding the split edge portions, respectively, whereby the male interlocking strip 13 is disconnected from the female interlocking strip 16. Thus, the boot is easy to attach from its open form and remove to its open form.

Embodiment B has advantages in addition to those of Embodiment A, as will be described below.

As the greater-thickness edge portions D1 and D2 protrude only from the inner surface of the boot, it is possible to reduce the pressure of contact between the corrugations of the bellows portion 35 along the edge portions D1 and D2 when the three-dimensional angular motion of the shaft in the universal coupling causes the bellows portion 35 to flex. Moreover, the shoulder 33a of the large-diameter ring portion 33 has a beveled surface to reduce a particularly high contact pressure which would otherwise act upon it. These features make it possible to retard the wearing of the boot surface arising from the mutual interference of the corrugations on the bellows portion as a result of its flexing. Therefore, the boot has a drastically improved level of durability.

The boot embodying this invention and having a beveled shoulder with a radius of 4.5 mm and a boot having a shoulder not beveled, but having a radius of 1.5 mm, were each attached to a universal coupling. The coupling was operated at 600 rpm and 30 cpm with its shaft inclined at an angle of 23 to 42 degrees to the housing, and measurement was made of the length of time for which its operation could be continued without causing any leakage of grease from the boot. The former boot (embodying this invention) did not show any leakage of grease even upon passage of 100 hours, but the latter showed leakage upon passage of about 50 hours.

I claim:

1. In a seal fastener provided between the facing edges of two sheetlike materials for joining and separating said edges, said edges extending along a direction, said fastener comprising a male interlocking strip extending in said direction and formed along said edge of one of said sheetlike materials, and having a bulging edge, and a female interlocking strip formed from a rubbery elastic material extending in said direction and along said edge of the other sheetlike material, and having an interlocking groove for receiving said male interlocking strip therein, the improvement which comprises:
   a clamped insert formed from a linear spring material and having a corrugated shape, said clamped insert extending continuously as one piece in said direction throughout a substantial length of said male interlocking strip and embedded in said male interlocking strip to impart rigidity to said male interlocking strip in the direction of interlocking; and
   a clamping insert formed from a linear spring material and having a generally convex ovoid cross-sectional shape, said clamping insert extending continuously as one piece in said direction throughout a substantial length of said female interlocking strip and embedded in said female interlocking strip about said interlocking groove to impart a resiliently holding force to said female interlocking strip between the opposite sides of said interlocking groove;
   wherein said male and female strips have surface portions, said clamped insert extends generally parallel to said surface portion of said male strip, and said clamping insert includes generally ovoid-shaped portions spaced along said direction and extending in planes at an angle to said surface portion of said female strip; and
   wherein said clamping insert includes generally linear portions extending generally in said direction and interconnecting said generally convex ovoid-shaped portions, said linear portions of said clamping insert being located on opposite sides of said groove.

2. In a boot for a universal coupling, said boot being formed from a high-molecular elastic material, and comprising a small-diameter ring portion, a large-diameter ring portion, a bellows wall portion extending between said ring portions, and a seal fastener, said boot being split in a straight line from said small-diameter ring portion to said large-diameter ring portion, and having a pair of longitudinal edge portions extending in a direction along said line and having a greater thickness than an opposite bellows wall portion and being provided with said fastener, said fastener comprising a male interlocking strip formed along the edge of one of said edge portions and having a bulging edge, and a female interlocking strip formed from a rubbery elastic material along the edge of the other edge portion, and having an interlocking groove for receiving said male interlocking strip therein, the improvement wherein:
   said boot having projections extending inwardly from inner surface portions of said boot at said edge portions providing said greater thickness of said edge portions, said large-diameter ring portion has an external annular shoulder which has a beveled surface along its entire circumference;
   said fastener includes a clamped insert formed from a linear spring material and having a corrugated shape, said clamped insert extending continuously as one piece in said direction and throughout a substantial length of said male interlocking strip and embedded in said male interlocking strip to impart rigidity to said male interlocking strip in the direction of interlocking, and a clamping insert formed from a linear spring material and having a generally convex ovoid cross-sectional shape, said clamping insert extending continuously, as one piece in said direction and throughout a substantial length of said female interlocking strip and embedded in said female interlocking strip about said groove to impart a resilient holding force to said female interlocking strip between the opposite sides of said groove,
   wherein said male and female strips have surface portions, said clamped insert extends generally parallel to said surface portion of said male strip, and said clamping insert includes generally convex ovoid-shaped portions spaced along said direction and extending in planes at an angle to said surface portion of said female strip; and
   wherein said clamping insert includes generally linear portions extending generally in said direction and interconnecting said generally convex ovoid-shaped portions, said generally linear portions of said clamping insert being located on opposite sides of said groove.

3. The boot defined in claim 2 wherein said longitudinal edge portions have a thickness of about 6 to 7 mm. and said opposite bellows wall portions a thickness of about 2 mm.

4. The boot defined in claim 2 wherein said bevelled surface has a radius of 3 to 5 mm.

5. In a seal fastener provided between the facing edges of two sheetlike materials for joining and separating said edges, said edges extending along a direction, said fastener comprising a male interlocking strip extending in said direction and formed along said edge of one of said sheetlike materials, and having a bulging edge, and a female interlocking strip formed from a rubbery elastic material extending in said direction and along said edge of the other sheetlike material, and having an interlocking groove for receiving said male interlocking strip therein, the improvement which comprises:
   a clamped insert formed from spring material extending continuously in said direction throughout a substantial length of said male interlocking strip and being embedded in said male interlocking strip to impart to the male interlocking strip rigidity in the direction of interlocking;
   a clamping insert formed from a linear spring material and having generally convex ovoid-shaped cross-sectional shape, said clamping insert extending continuously as one piece in said direction throughout a substantial length of said female interlocking strip and embedded in said female interlocking strip about said interlocking groove to impart a resilient holding force to said female interlocking strip on opposite sides of said interlocking groove; and wherein said female interlocking strip has a surface portion, and said clamping insert includes a series of said generally convex ovoid shaped wire portions spaced along said direction and lying in planes at an angle to the surface portion of said female interlocking strip, and a plurality of wire portions extending in said direction and interconnecting said generally convex ovoid shaped wire portions.

* * * * *